United States Patent [19]

Nakanome et al.

[11] Patent Number: 4,892,609
[45] Date of Patent: Jan. 9, 1990

[54] AUTOMATIC MATERIAL FEEDER IN TIRE FORMING MACHINE

[75] Inventors: Heikichi Nakanome; Takeshi Yonezawa, both of Hiratsuka, Japan

[73] Assignee: The Yokohama Rubber Co., Ltd., Tokyo, Japan

[21] Appl. No.: 133,180

[22] Filed: Dec. 11, 1987

Related U.S. Application Data

[63] Continuation of Ser. No. 810,146, Dec. 18, 1985, abandoned.

[30] Foreign Application Priority Data

Dec. 23, 1984 [JP] Japan .................. 59-271032

[51] Int. Cl.⁴ .............................. B29D 30/30
[52] U.S. Cl. ................... 156/406.4; 156/405.1
[58] Field of Search .............. 156/379, 405.1, 406.4, 156/406, 414, 64, 123, 133, 353, 360, 363, 517; 198/435, 369

[56] References Cited

U.S. PATENT DOCUMENTS 3,841,941 10/1974 Leblond et al. .................. 156/406
3,898,116 8/1975 Kitagiri et al. ................. 156/406 X
4,457,802 7/1984 Yanagihara et al. ............. 156/405.1

Primary Examiner—Raymond Hoch
Attorney, Agent, or Firm—Armstrong, Nikaido, Marmelstein, Kubovcik & Murray

[57] ABSTRACT

An automatic feeder for feeding tire building materials in a tire building machine, which is installed on a base plate and mainly comprises two stock rolls arranged on the side of supplying tire building materials (rubber sheet materials), cloth inspection means (not shown), multistage first feeders provided with automatic cutting apparatus and centering apparatus, second feeders arranged on the discharging side of the first feeders, and a tire-forming drum apparatus arranged on the discharging side of the second feeder, and which ensures that many kinds of tire building materials can be subjected to an automatic cloth inspection and automatic cutting and be efficiently fed by one feeder without the need for a large installation space.

3 Claims, 4 Drawing Sheets

AUTOMATIC MATERIAL FEEDER IN TIRE FORMING MACHINE

This application is a continuation of application Ser. No. 810,146 filed 12/18,85, now abandoned.

BACKGROUND OF THE INVENTION

The present invention relates to an automatic feeder of tire building materials in a tire building machine, and more specifically, an automatic material feeder which enables an automatic feeding of many kinds of sheet materials to be applied to the crown portion of a tire by one apparatus.

In known feeders in a tire forming machine which feed sheet materials to be applied to a crown portion of a tire, a multistage rack is used for manually applying the sheet materials.

However, the manual operation has a poor working efficiency and, in addition, involves a danger, and thus a feeder incorporating automatic cloth inspection and automatic application has recently been proposed, as disclosed for example in Japanese Patent Application Laying-Open Publication No. 58-59829.

However, in the above described automatic feeder, it is necessary to laterally provide individual automatic feeders for each tire constituent material, laterally slide a tire forming drum after one applying operation has been completed, and they carry out a separate operation for applying a next material.

Therefore, a large space is required for the installation of each feeder and the automatic feeder itself is required to be increased in number when additional materials are to be applied to steel materials as practiced in recent years, and thus there has been a problem of the need for a broader space than before and of an increase in the machine installation cost.

SUMMARY OF THE INVENTION

A first object of the present invention is to provide an automatic feeder for feeding constituent materials for tires in a tire forming machine which is made capable of automatically feeding tire constituent materials without the need for a large space.

A second object of the present invention is to provide an automatic feeder of tire constituent materials in a tire forming machine which enables an automatic feeding of many kinds of tire building materials while an automatic cloth inspection is simultaneously carried out by a single feeder above.

DETAILED DESCRIPTION OF THE INVENTION

Now, the present invention will be explained in connection with embodiments thereof, in conjunction with the attached drawings.

Figure 1:
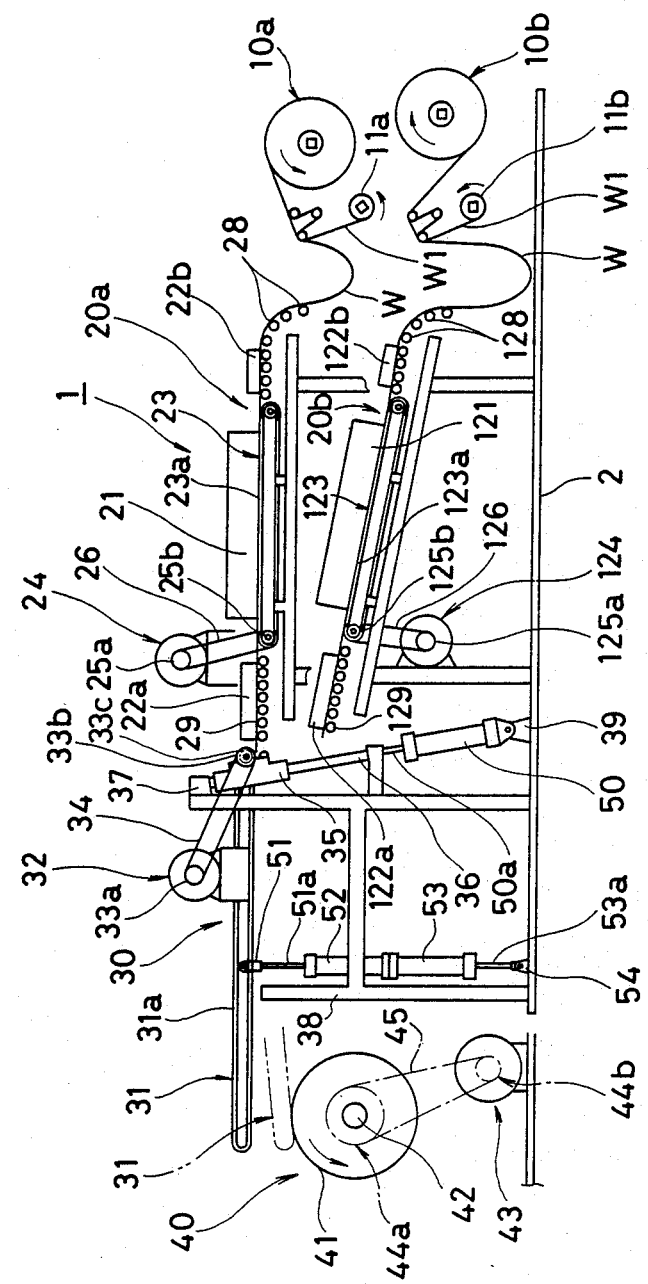
FIG. 1 is a side view of an automatic feeder of constituent materials for tires embodying the present invention.
Figure 2:
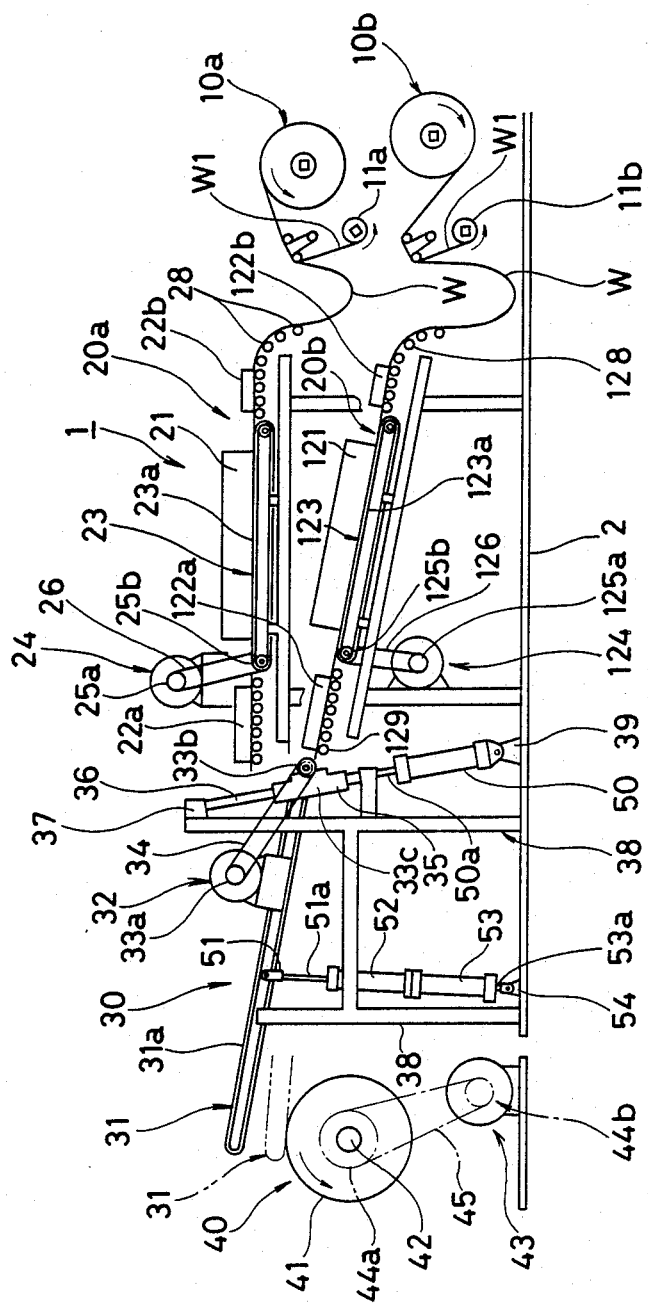
FIG. 2 is a side view, showing an operation condition in which a front conveyor is transferred to its lower part.

FIG. 1 is an overall side view of an automatic feeder 1 for feeding tyre forming materials in a tire building machine of an embodiment of the present invention and FIG. 2 is a side view showing an operation condition of the automatic feeder 1, wherein the automatic feeder 1 is provided on a base plate 2 and mainly comprises a plurality of stock rolls 10a and 10b (two in this embodiment) arranged on the feeding side of tire constituent materials W (rubber sheet materials W), cloth inspection means (not shown), automatic cutting apparatus 21, 121, multistage first feeders 20a and 20b provided with centering apparatus 22a, 22b and 122a, 122b, respectively, a second feeder 30 arranged on the discharging side of the first feeders 20a and 20b, and a tire forming drum apparatus 40 provided on the discharging side of the second feeder 30.

The tire building materials W and a liner $W_1$ are rolled on the above described stock rolls 10a and 10b, and the materials W for tires are fed by a conventional method such that the materials W are delivered by driving take-up rolls 11a and 11b by a motor (not shown) according to needs and taking up the liner $W_1$. The stock rolls 10a and 10b and the take-up rolls 11a and 11b are arranged in parallel in the longitudinal direction.

In the first feeder 20a on the upper side of the above described first feeders 20a and 20b, the reference numberal 23 denotes a rear conveyor and comprises known carrier holding means (vacuum and magnet, etc), on which the automatic cutting apparatus 21 for cutting the above described tire building materials W is provided.

The above described rear conveyor 23 is adapted for correctly carrying the materials in accordance with the control effected by a servomotor 24 through a pulley 25a mounted on the servomotor 24, a pulley 25b mounted on the rear conveyor 23, and a driving belt 26. The reference numeral 28 indicates a plurality of rollers for carrying the materials on the inlet side of the rear conveyor 23 and the reference numeral 22b denotes a suitable centering apparatus for the constituent materials for tires. The reference numeeral 29 indicates a plurality of rollers for carrying the materials on the outlet side of the rear conveyor 23, while the reference numeral 22a denoting a suitable centering apparatus for the constituent materials for tires.

Alike the above, in the first feeder 20b at the lower stage, the reference numeral 123 indicates a rear conveyor at this lower stage and has a same known carrier holding means 123a as the upper stage.

The reference numeral 121 is an automatic cutting apparatus for the tyre constituent materials W, the reference numeral 124 being a servomotor, reference numerals 125a and 125b being pulleys, the reference numeral 126 being a driving belt, the reference numeral 128 being a roller, the reference numeral 122b being a centering apparatus, the reference numeral 129 being an outlet side roller, and the reference numeral 122a being a centering apparatus.

In the second feeder 30, the reference numeral 31 is a conveyor which has a known carrier holding means (vacuum and magnet, etc). A driving servomotor 32 is mounted on a frame (not shown) of a front conveyor 31 which is adapted to correctly carry the materials in accordance with the control effected by pulleys 33a and 33b and a driving belt 34.

A rear roll 33c of the front conveyor 31 is rotatably mounted on a shaft provided on a movable base 35, and a pulley 33b is mounted on the shaft. The movable base 35 is slidably mounted on a pair of guide rods 36.

The reference numeral 37 denotes bosses which secure guide rods 36 and are each secured to the frame 38.

Cylinders 50 which constitute a position-correcting mechanism are mounted via members 39 on the base plate 2.

An output rod 50a of each cylinder 50 is connected to the movable base 35 by suitable means.

Thus, the movable base 35 can be moved by the cylinders 50. The above-described embodiment concerns the case in which two positions, an upper and a lower one, can be taken, but it is possible to devise to establish several positions.

In addition, a cylinder 52 having a cylinder rod 51a is secured to the frame of the front conveyor 31 through a member 51 at a given position, and a cylinder 53 is fixed to the rear of each cylinder 52 with an output rod 53a thereof mounted on the base plate 2 via a member 54. The above-described mechanism constitutes conveyor means by which the front conveyor 31 can be longitudinally moved, but the cylinders 52 press the front conveyor 31 against (or close to) a tire forming drum 41 which will be described below. The cylinders 52 are linked to the cylinders 50 and change the linkage positions for the first feeder 20a of the upper stage and the first feeder 20b of the lower stage, while correctly holding the relative position of the front conveyor 31 to the forming drum 41.

A tire forming drum apparatus 40 comprises a forming drum 41 held by a rotatably-mounted forming drum shaft 42 inserted therein which is rotated and driven by a servomotor for driving 43.

Reference numerals 44a and 44b denote pulleys, and the reference numeral 45 denotes a driving belt. These ensure that the forming drum 41 is able to rotate correctly, controller by the driving servomotor 43.

FIGS. 3(a) to 3(d) are explanatory plan views, showing sequential operation phases of a cycle of the automatic feeder of tire-forming materials illustrated in FIGS. 1 and 2.

Figure 3A:
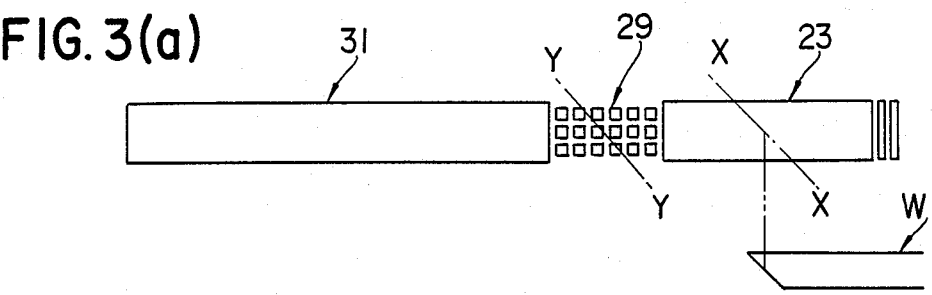
FIGS. 3(a) to 3(d) are explanatory views, showing an operation cycle in which the supplying, cloth inspection, cutting and dividing of constituent materials of a tire are carried out.

Initially, as shown in FIG. 3(a), the tire building material W is aligned in position with the cutting line X—X of the automatic cutting apparatus 21 (FIGS. 1 and 2) on the rear conveyor 23. The rear conveyor 23 and the front conveyor 31 are driven in synchronism by the respective servomotors 24 and 32 to transport the tire building material W forward while at the same time, the material W is inspected by suitable cloth or sheet inspection means and measured.

Figure 3B:
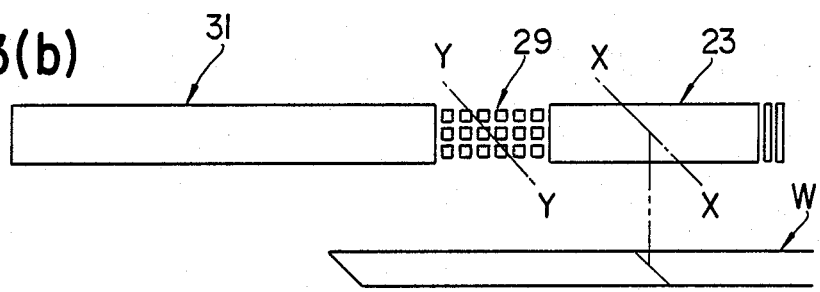

FIG. 3(b) shows the step in the operation cycle following inspection of the material W where the front and rear conveyors are stopped and the material W is cut to the prescribed length by the automatic cutting apparatus 21. Where the tire building material W is one including steel cords or the like, the cutting is carried out along the cords without cutting means.

Figure 3C:
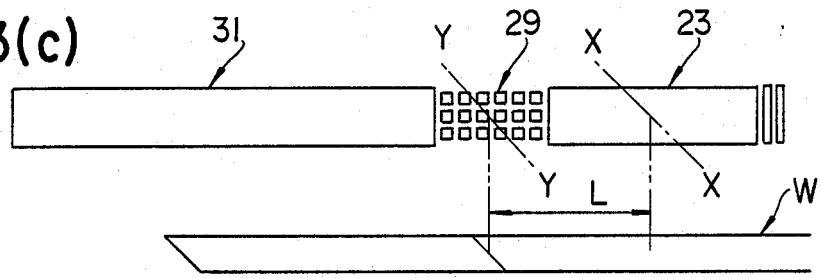

FIG. 3(c) shows the step in the operation cycle where the cut port of the material W and the following portion have been transported to the point where cut edge line therebetween registers with a line Y—Y connecting rollers 29.

Figure 3D:
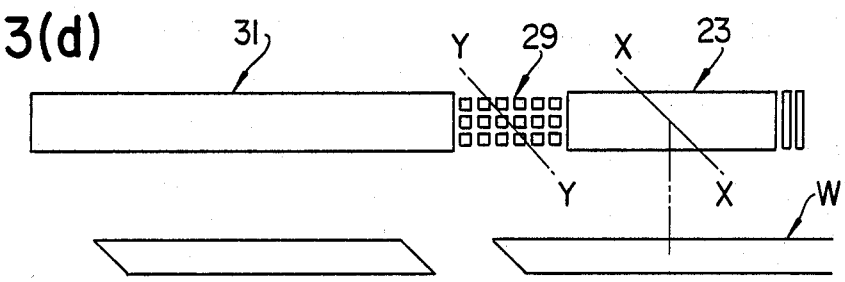

In the further advanced stage of the operation cycle shown in FIG. 3(d), the front conveyor 31 alone is driven to separate and feed the cut portion of the material W to the forming drum 41.

When the feeding of the first cut portion of the material W has been completed as described above, the steps of the operation cycle continue from the step shown in FIGS. 3(b) through 3(d) as indicated by the arrow, and the cycle is repeated.

FIG. 3(c) also shows the distance from the line X—X to the line Y—Y through which the first cut portion of the material W was conveyed as a first measured length L. This first measured length L is recorded and as can be seen in FIG. 3(c) is shorter than the prescribed length to which the material W is cut.

In each succeeding measurement of the material W, since the apparatus automatically moves the material W up to the position shown in FIG. 3(c) (that is, through the distance L), the only portion of the material W that has to be measured is the amount of the prescribed length less the first measured length L. This simplifies the measuring. Additionally, as the apparatus automatically moves the succeeding portion up to the position shown in FIG. 3(c), the material W can be inspected by the cloth or sheet inspection means, so that only the remaining length of material W has to be inspected during movement of the succeeding portion to the position of FIG. 3(b). This speeds up inspection.

If the tire building materials W contain steel cords, etc. and are stiff, free rollers may be used for the above-described rollers 29, while if the materials comprise only materials W and are not stiff, it is necessary to use driving rollers with a suitable mechanism. At the portion of the rollers 29, there is provided the centering apparatus 22a, which is arranged so as to be able to place the tire constituent materials W back in the correct position when the materials W have been cut by the automatic cutting apparatus 21 and have been shifted.

The tire building materials (W), which are carried into the front conveyor 31 and cut to the given length, are carried to a suitable position with respect to the tire forming drum 41 while being held in the correct position by the carrier holding means 31a on the under side of the front conveyor.

In this state, the front conveyor 31 is brought close to (or pressed into contact with) the forming drum 41 by the cylinders 52.

The cylinders 52 are provided with apparatus (not shown) for regulating and controlling their stroke by a suitable means, to correspond to the size of the forming drum 41.

Subsequently, the materials (W), which are cut to the given length, can be correctly attached to the forming drum 41 without any transformation by correctly synchronizing the surface peripheral speed of the forming drum 41 with the feed speed of the front conveyor 31 by the respective servomotors 43 and 32.

The front conveyor 31 is separated from the forming drum 41 by cylinders 52, and then cylinders 53 and 50 are driven to move the front conveyor 31 to the first feeder 20b in the lower stage, without any change in the relative positional relationship between the forming drum 41 and the front conveyor 31 (FIG. 2), to perform the automatic cloth inspection, automatic cutting, and automatic application of a next batch of tire constituent materials (W).

Since the materials (W) are already attached to the forming drum 41, the peripheral speed of the forming drum 41 at this time is increased in proportion to the thickness of the materials, and the front conveyor 31 acts to apply the materials (W) in a cycle at this peripheral speed.

The above-described embodiment comes under the case wherein the first feeder 20a of the upper stage and the front conveyor 31 are linked to apply materials (W), and then the conveyor is moved to the first feeder 20b of the lower stage, but the reverse operating order will present no problem.

In addition, this embodiment represents the case wherein the movement position of the front conveyor 31 produces no change in its relative positional relationship with the forming drum 41, but the rear first feeders 20a and 20b of a further stage, such as a third stage, may encounter difficulties in satisfying this condition. In this case, the difficulty can be removed by controlling the stroke of the cylinders 52 which make the front conveyor 31 come close to (or to be pressed into contact with) the forming drum 41.

Figure 4:
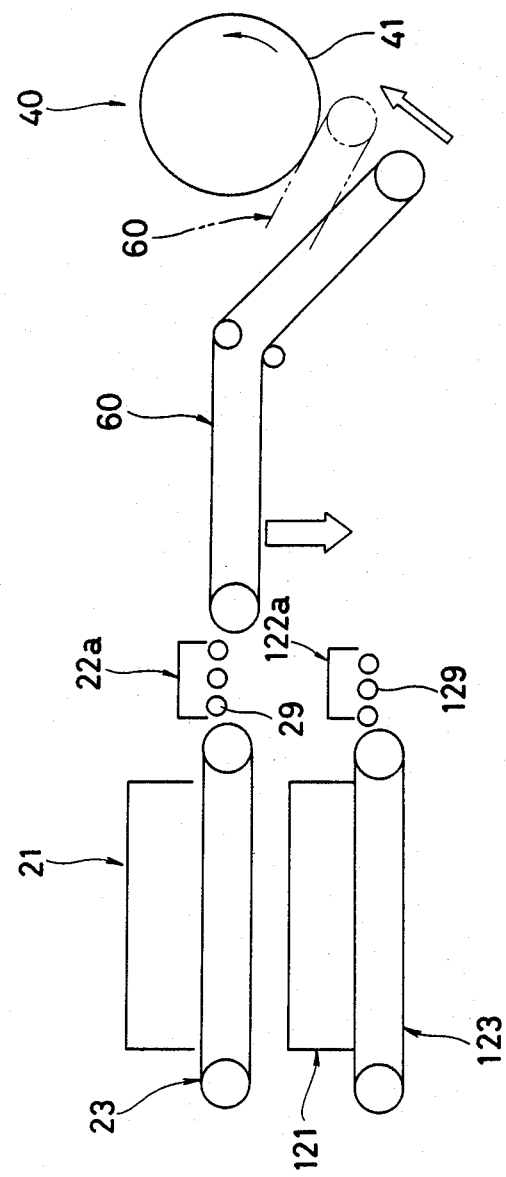
FIG. 4 is a side view of another embodiment of the invention, wherein the front conveyor has a carrying plane on the upper surface thereof.

Furthermore, this embodiment illustrates the case wherein the front conveyor 31 has a carrying surface on its under side and applies the materials downward onto the forming drum 41, but a front conveyor 60 having a carrying surface on the upper side may be used, as shown in FIG. 4.

Other structures and operations of this embodiment are the same as those of the first embodiment and so same symbols are employed, and the description thereof is omitted.

As described above, the apparatus of the present invention is disposed on the side of feeding tire constituent materials, and comprises first feeders of a multistage system, each provided with cloth inspection means, automatic cutting apparatus and centering apparatus, second feeders for guiding tire building materials to a tire forming drum on the discharging side of the first feeders, and comprises also a position correcting mechanism for connecting inlet portions of the second feeders to the discharging portions of the first feeders of the multistage system, and movable means for moving the discharging portions of the second feeders towards and away from the forming drum, and thus it has the effect that many kinds of tire constituent materials can be subjected to an automatic cloth inspection and automatic cutting and be efficiently fed by one feeder without the need for a large installation space.

Furthermore, the apparatus of the present invention can be made at a low cost and is easy to maintain because of its simple structure.

We claim:

1. An automatic feeder for feeding tire building material in a tire building machine, comprising a plurality of first feeders disposed in a multistage vertical arrangement on a material supplying side, each of said first feeders being provided with cloth inspection means, with automatic cutting apparatus, with centering apparatus and with a discharge portion; a single second feeder disposed at the discharge end of said discharge portion feeders of said first feeder for receiving tire building material from the discharge portion of a selected one of said first feeders and for guiding the tire building material to a tire forming drum, said second feeder having an inlet portion and a discharge portion; first moving means connected in said inlet portion of said second feeder and second moving means connected to said second feeder intermediate said inlet portion and said discharge portion of said second feeder, means for operating said first and second moving means for moving said inlet portion of said second feeder to the discharge portion of said selected one of said first feeders and to the one of said first feeders selected thereafter, respectively, for receiving tire building material from said selected one of said first feeders; and third moving means aligned with said second moving means for moving said discharge portion of said second feeder with said receiving tire building material thereon into alignment with said tire forming drum for feeding said receiving tire building material from said discharge portion of said second feeder to said tire forming drum and for moving said discharge portion of said second feeder away from said tire forming drum after said tire building material is transferred to said tire forming drum, said each first feeder being further provided with a group of separating rollers at said discharge portion of said first feeders and driving means for driving said rollers independent of said first and second feeders and separating tire building material on said second feeder from tire building material on said selected first feeder.

2. An automatic feeder according to claim 1, wherein said second feeder has a carrying surface on the under side of a front conveyor so as to apply the tire building materials downwardly onto said forming drum.

3. An automatic feeder according to claim 1, wherein said second feeder has a carrying surface on the upper side of a front conveyor so as to apply the tire building materials upwardly onto said forming drum.

* * * * *